June 14, 1955
K. B. THOMPSON
2,710,560
OPTICAL PRISM SYSTEM
Filed May 31, 1949
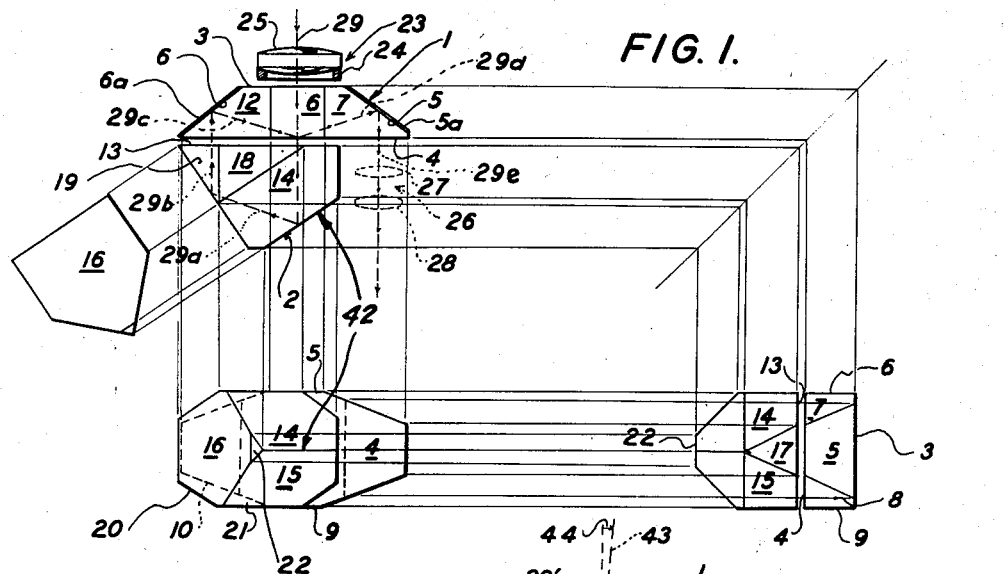
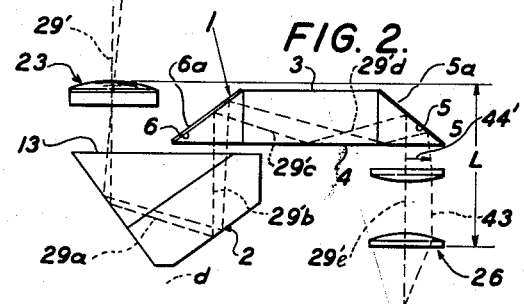
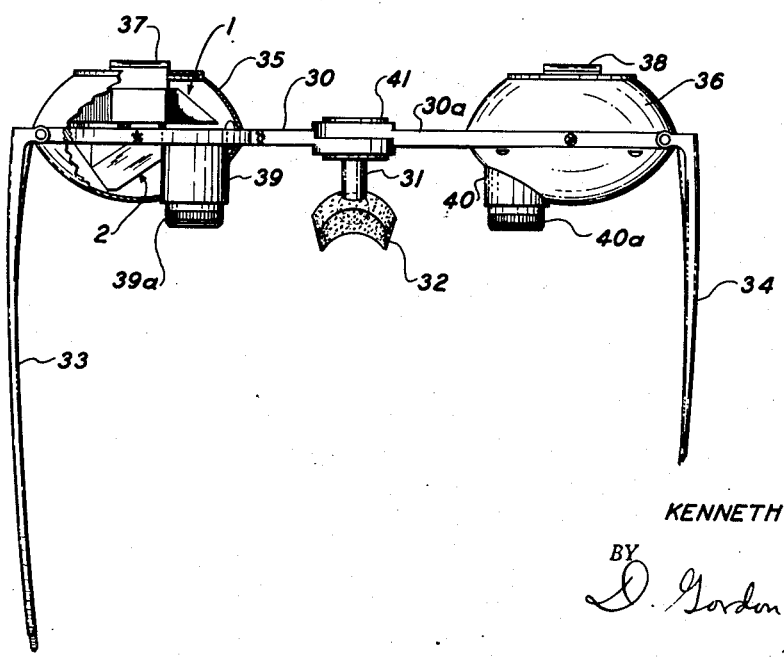
INVENTOR.
KENNETH B. THOMPSON
BY D. Gordon Angus
ATTORNEY

United States Patent Office 2,710,560
Patented June 14, 1955

2,710,560

OPTICAL PRISM SYSTEM

Kenneth B. Thompson, Sierra Madre, Calif., assignor of one-fourth to D. Gordon Angus, San Marino, Calif.

Application May 31, 1949, Serial No. 96,178

9 Claims. (Cl. 88—33)

This invention relates to optical systems and has for an object to provide an optical system capable of being made with a relatively long optical path through the system, while at the same time having a relatively short dimension from front to back. A related object is to provide such a prism system having parallel entrance and exit axes, and capable of erecting an image.

In general, the optical "power" of a telescopic optical system is related to its focal length, the greater the focal length, the greater being its power. A common disadvantage of a relatively great focal length, however, resides in the relatively long dimension from front to back.

In accordance with my present invention, I overcome the disadvantage of inconveniently large dimensions of the equipment while still obtaining a long optical focal length, by use of a prism system which carries the light laterally for a substantial distance in such a way that the lateral path of the light is included in the optical focal length.

I carry out my invention by the combination of two prisms. A first of the prisms has a pair of principal parallel transparent faces, one of which is longer than the other, and a pair of converging oblique reflecting faces joining the principal parallel faces. The second prism is a cube corner prism, two reflecting faces of which constitute a so-called "roof." By placing the base of the cube corner adjacent a portion of the longer face of the first-mentioned prism, I can cause a light beam or ray to take a path through the parallel faces of the first prism, into the cube corner prism and back to the first prism, the path extending for a substantial distance laterally through the prisms. The paths into, and emerging from the first-mentioned prism are parallel to each other; and accordingly an eyepiece and an objective may be located at these entrance and emerging positions.

A property of this prism arrangement is that the image of a distant object formed by the objective, which would be normally inverted, will be erected in all azimuths by my novel prism arrangement.

A feature of the arrangement resides in the construction of the first-mentioned prism which allows light having normal incidence to the principal parallel faces to pass through without substantial reflection; while light incident at greater than the critical angle is substantially fully reflected. This enables light reflected from the oblique reflecting surfaces to be reflected at the transparent principal face of the prism.

The arrangement is applicable to various types of optical systems such as telescopes, binoculars and eye spectacles. It is particularly advantageous in such devices as binoculars and spectacles wherein it is desirable to maintain a short distance from front to back.

The foregoing and other features of my invention will be better understood from the following description and the accompanying drawings, of which:

Fig. 1 illustrates, in orthographic projection an optical system according to my invention;

Fig. 2 illustrates an arrangement of the optical system according to my invention showing the positions of objective and eyepiece lenses; and Fig. 3 illustrates an arrangement of spectacles using the optical system of Figs. 1 and 2.

Referring to Figs. 1 and 2, the optical system comprises a pair of solid prisms 1 and 2, which may be of glass or other suitable optical material. The prism 1 is an isosceles prism and has a pair of plane parallel opposite faces 3 and 4; and a pair of converging faces 5 and 6 which are oblique to the face 3. Thus the face 4 is larger than the face 3. All the faces 3, 4, 5 and 6 lie in vertical planes, with reference to Fig. 1 and the angles between faces 4 and 6 and faces 4 and 5 should be equal and within the range of approximately 20° to 40°.

The base angles of the isosceles prism, that is the dihedral angles between faces 4 and 5, and between faces 4 and 6, will be selected to have an angular value of "$a$" degrees, such that the angle made by the reflected beam 29$c$ (Fig. 1) or 29'$c$ (Fig. 2) with a normal to face 4 is equal to or greater than the critical angle, so that total reflection from face 4 will result. The size of this angle between beam 29$c$, or 29'$c$, and the normal will be equal to twice "$a$" degrees for a beam striking the principal face 4 substantially normally. If the critical angle is 40°, for example, then the angular value "$a$" must be 20° or more for total reflection to occur. "$a$" cannot exceed 45°, for then beams 29$c$ or 29'$c$ would never reach the face 4. It will be appreciated that this total reflection can occur over the whole of face 4, depending on the placement of the entering beam, and on the value of the angle "$a$." Surfaces 4, 5 and 6 are all perpendicular to a common plane. According to a preferred embodiment of the invention, surface 16 of prism 2 is also perpendicular to this common plane, making four surfaces perpendicular thereto, although this position of surface 16 is not essential to the proper operation of the system.

Face 4 may be considered as having two principal regions. With respect to its position in Fig. 2, the left hand portion where rays 29'$b$ enter may be called the light entrance face and the right hand portion where the rays 29'$e$ depart may be called the light exit face.

For the sake of eliminating unnecessary material in the prism, some of the edges may be cut down forming, for example, the edge faces 6, 7, 8, 9, 10 and 12. Of these, the edge surfaces 6 and 9 will ordinarily be of equal size and dimension and parallel to each other and perpendicular to the principal parallel faces 3 and 4; and the remaining edge surfaces will ordinarily be oblique with references to the principal faces. The oblique faces 5 and 6 should preferably be made totally reflecting, and accordingly are covered with a suitable silvering or aluminizing coating 5$a$ and 6$a$, respectively. The faces 3 and 4 should be transparent, however.

The cube corner 2 often denoted as a "retrodirective reflecting prism," is provided with a plane base face 13 which, in the present combination is placed parallel with the face 4 of prism 1. Three mutually perpendicular faces 14, 15 and 16 slant from the base 13 to form the cube corner. The faces 14 and 15 are arranged to form the "roof" and their intersection is at the "roof edge" 42. It is an inherent property of such a pair of roof surfaces that light striking one of the roof surfaces is reflected to the other roof surface; and inverts the image in one azimuth. The imaginery line through the apex perpendicular to the base 13, divides the "roof" portion of the cube corner prism from the third reflecting face 16. In order to make the prism 2 as small as possible, it will usually be preferable, although not necessary, to cut away unused corners of the prism as shown. Thus, cuts forming plane surfaces such as 17, 18, 19, 20, 21 and 22, and perhaps even further cuts may be made to reduce the size.

If desired, the mutually perpendicular surfaces 14, 15 and 16 may be coated with a silvering or aluminizing, or the like, but such coating will not be necessary inasmuch as substantially total reflection will be had at these surfaces anyway, owing to the fact that the angle of incidence of light striking them, relative to their normal, is greater than the critical angle. In addition to its other favorable properties, the cube corner has constant deviation in all azimuths, which in the present instance is favorable to maintaining collimation of the two axes of a binocular.

The cube corner prism 2 is set off to one side of the prism 1, as illustrated in the upper view of Fig. 1, so as to leave exposed a substantial part of the face 4 of prism 2. This will leave room for viewing the prism 1.

The cube corner prism has the well known property of such prisms, of a "constant deviation"; that is, it may be tilted with reference to its base without changing the direction of the beam emerging from it. For this reason it is possible for its base 13 to be somewhat non-parallel relative to surface 4 of prism 1. This inherent property of the cube corner to provide constant deviation in all azimuths is sometimes denoted "retrodirective reflection." The term "retrodirective reflection" implies that a ray incident on the base 13 of the prism 2 will be reflected by the prism so that the reflected ray is parallel to the incident ray. This relationship will hold for any angle of incidence of a ray entering the prism through the transparent base 13. An individual ray, while emerging parallel to its incident direction, will also be displaced across the apex of the prism, as indicated in the drawings. The term "substantially parallel" as used in this specification and claims means the condition of the base 13 being parallel or nearly enough parallel so that the light ray from the oblique surface 6 of the isosceles prism goes directly to one of the mutually perpendicular reflecting surfaces of the roof prism.

In accordance with conventional practice there is illustrated an objective lens system 23 shown in conventional form with a concave lens 24 in combination with a convex lens 25. This is placed adjacent the rear face 3 of prism 1 at a position opposite the base 13 of roof prism 2. There is also shown in dotted lines an eyepiece lens system 26 shown in conventional form with a pair of convex lenses 27 and 28, which may be used if desired. The eyepiece may conveniently be nested adjacent the portion of face 4 of prism 1, alongside of the prism 2.

The operation of the prism system shown in Fig. 1 is illustrated by the light ray 29 from an object. This light ray will travel through the objective lens 23 and then perpendicularly through the plane parallel faces 3 and 4 of prism 1, and likewise through the plane surface 13 of prism 2, until it strikes one of the "roof" faces of the cube corner prism. According to the peculiar properties of roof prisms, the ray is then deflected from the particular one of these faces which is first struck, over to the second roof face, after which it is reflected to the third surface of the prism along line 29a and thence in the direction parallel to the incident ray 29. The ray is thus returned perpendicularly back through face 4, until it strikes the oblique surface 6a of prism 1, which because of its silvered reflecting face, will then reflect the ray along direction 29c, until it again strikes the surface 4 of prism 1; since the angles of surfaces 5 and 6 relative to the larger principal face 4 are acute enough so that there is an acute angle between the incident and reflected rays at these oblique surfaces, as shown by the line of the light ray. This time the ray does not emerge from the prism 4, because of the angle of incidence of ray 29c, relative to the normal, is a greater angle than the "critical" angle of the prism face. By reason of this, it is reflected from transparent face 4 along line 29d, until it strikes the oblique face 5, which because of its mirrored surface reflects the ray in the direction perpendicular to face 4, so that it passes directly through face 4, alongside of the roof prism 2, and parallel to the incident ray 29, thus passing through the eyepiece lens if the latter be present.

The effect of the "critical" angle in determining whether there is substantially total reflection or substantially total non-reflection from a transparent surface, is a well known principle in optics. The critical angle will vary somewhat with different optical materials. For the types of glass usually used for optical reflecting prisms, the critical angle ranges from about 37 to 42 degrees. When the angle of ray incidence to the normal is less than this, there is substantially no reflection, and the ray passes through the transparent surface; but when the angle of the incident ray to the normal is greater than the critical angle, there is substantially total reflection at the transparent surface.

Other similar rays passing from an object through the objective lens to the eyepiece will behave in a way similar to ray 29, that is, they will first pass through prism 1 to the cube corner prism 2, which according to its peculiar operation will then return it to the prism 1 along lines which throughout, bear a constant angular relationship to ray 29. Thus, if these rays are traced through to the focal plane, the image, which would ordinarily be inverted, will be completely erected. This erection of the image is shown diagrammatically in Fig. 2.

Fig. 2 illustrates a combination of the prisms together with their eyepiece and objective, which is somewhat modified from that shown in Fig. 1. In Fig. 2, the prisms 1 and 2 are the same as the same numbered prisms in Fig. 1; but in Fig. 2, the prism 2 is moved further to the side than it is in Fig. 1. In this arrangement, a substantial portion of the roof prism 2 extends beyond the edge of the prism 1. This leaves room for nesting the objective 23 alongside of prism 1, while still nesting the eyepiece 26 alongside the roof prism. This will allow making the over-all front to back dimension L shorter than in Fig. 1, while extending the lateral dimension somewhat.

The optical rays travel in a manner similar to that explained in connection with Fig. 1; thus, the ray 29', corresponding to ray 29 in Fig. 1, will pass into the cube corner prism, make the three reflections off the prism surfaces, represented by line 29a', then pass into the prism 1 along direction 29b' and then pass laterally through prism 1 along lines 29c' and 29d', followed by the final reflection along the line 29e' through the eyepiece 26. The erecting operation in one azimuth is illustrated by the optical line 43 from the point of arrow 44 representing the orientation of a distant object. Line 43 passes through the objective lines 23 to the surface 16 of the cube corner, and then on to all of the other surfaces of the prism system in the same sequence as has been described for a principal ray 29', excepting however, that ray 43 continues to diverge somewhat from line 29'. Thus, when ray 43 finally emerges from prism 1, it is on the same side of the axis 29e' as it was at arrow 44; and this orientation is represented by the arrow 44'. The emerging ray 43e' passes through the eyepiece 26 which converges it to the point P which is the exit pupil.

In Fig. 2, the location of the "roof" faces of prism 2 has been modified from that of Fig. 1, so that the rays strike the "roof" and surface 16 in a sequence reversed from that of Fig. 1. This variation is merely a matter of preference and does not affect the erecting of the image in any way. Also without going into further detail, it should be apparent that the positions of the objective and eyepiece relative to the erecting prism system can be exchanged, and may be found preferable in some applications.

Fig. 3 illustrates the application of my optical system to a pair of spectacles. These comprise the usual support 30, the central nosepiece 31, shown provided with a soft spongelike pad 32 to rest against the nose, and the usual ear pieces 33 and 34. The prism systems are mounted within housings 35 and 36 carried on the support 39; the housing 35 being partially in section to show the position of the prisms. The objective lenses 23 for the left and right prism systems are mounted within objective housings 37 and 38, respectively, set at the front of each respective housing 35 and 36 in a central position, relative to prism 1, this being the position shown in Fig. 1. The eyepieces for the left and right prism systems are mounted within eyepiece housings 39 and 40 which are set within the rear of the respective housings 35 and 36 at the position shown for eyepiece 26 in Fig. 1. According to a common practice, the eyepiece units are individually adjustable for focus within 39 and 40 by means of a sliding fit or a thread adjustment. The eyepiece housings 39 and 40 will be set apart the distance between the eyes of the wearer; and to make this distance adjustable, to provide for different people, the two mounting members 30 and 30a can be pivoted on their pivot member 41.

It will be recognized that each of the left and right optical systems of the spectacles will operate according to the system shown in Fig. 1. It will also readily be recognized that, if desired, the modification shown in Fig. 2 could be used in the spectacles instead of that shown in Fig. 1.

By my invention I have provided a relatively simple optical system capable of erecting an image and capable of relatively great power or magnification, and of relatively small size and with an exceptionally short distance from front to back. Owing to its simplicity, the system can easily be installed in such applications as binoculars and spectacles, telescopes and the like.

It will be recognized that many modifications may suggest themselves within the scope of the invention and the invention is not limited except in accordance with the scope of the appended claims.

I claim:

1. A two-prism optical system comprising a pair of solid prisms, a first of said prisms being an isosceles prism having a pair of oppositely disposed parallel plane principal faces, one of which is larger than the other, and a pair of converging reflecting oblique surfaces extending between said principal faces, the second of said prisms being a roof prism having a transparent base and three mutually perpendicular reflecting surfaces, the base of said second prism being placed substantially parallel to and adjacent the larger principal face of the first prism, but leaving at least some space between the first and second prisms, and leaving exposed a portion of said larger principal face adjacent one of said oblique surfaces.

2. An optical device for magnifying the appearance of an object, and adapted to be applied to the eyes of a user, comprising a pair of housings supported a distance apart which corresponds with the distance between the eyes, each of said housings having a first prism and a second prism, the first prism being an isosceles prism comprising a forward plane transparent face and a rear plane transparent face parallel to and larger than the forward face, said forward and rear faces being connected by a pair of converging oblique surfaces making equal acuate angles of less than 45° with the rear face, the second prism being a roof prism having a base and three mutually perpendicular reflecting surfaces, said base being substantially parallel to and adjacent a portion of said rear surface of the first prism, there being at least some space between the first and second prisms, an objective lens mounted in the housing in front of the roof prism so that light from an object passes through the objective into the roof prism, and an eyepiece lens means mounted in the housing at the rear of said larger face and to the rear of the second oblique surface.

3. A two prism optical system comprising a pair of solid prisms, a first of said prisms being an isosceles prism having a pair of oppositely disposed transparent parallel plane principal faces, one of which is longer than the other, and a pair of converging reflecting oblique surfaces extending between said principal faces, the longer of said principal faces comprising both a light entrance face and a light exit face for light reflected by said first prism, said oblique surfaces making an angle with the longer principal face of "a" degrees, the angular value "a" being less than 45° and more than approximately 20°, said angular value "a" being of a size such that a beam entering the first prism through the light entrance face and being normal to said light entrance face strikes a first of said oblique surfaces and is reflected to the longer principal face so as to make an angle of twice "a" degrees with the normal to said longer principal face which is greater than the critical angle for total reflection from said principal face, the longer principal face and the oblique surfaces all being perpendicular to a common plane, the second of said prisms being a retrodirective reflecting prism having a transparent base and three mutually perpendicular reflecting surfaces which diverge from each other toward said transparent base, the base of said second prism being placed substantially parallel to and adjacent the light entrance face of the longer principal face of the first prism but leaving at least some space between the first and second prisms, so that a first of the oblique surfaces partially faces the retrodirective reflecting prism, and leaving exposed the light exit face of the longer principal face of the first prism adjacent to the second of said oblique surfaces, whereby light rays from an object enter the retrodirective reflecting prism, undergo three reflections therein, are reflected out of the retrodirective reflecting prism in the direction parallel and opposite to that in which they entered the retrodirective reflecting prism, then enter the first prism through the light entrance face of its longer principal face, are then reflected from the first oblique surface to said principal face, whence they are reflected to the second oblique surface and out from the light exit face of the prism.

4. An optical system according to claim 3 in which an objective lens is located in the path of the light from the object to the retrodirective reflecting prism, and an eye-piece lens means is located in the light path leaving the second oblique surface.

5. A two prism optical system comprising a pair of solid prisms, a first of said prisms being an isosceles prism having a pair of oppositely disposed transparent parallel plane principal faces, one of which is longer than the other, and a pair of converging reflecting oblique surfaces extending between said principal faces, the longer of said principal faces comprising both a light entrance face and a light exit face for light reflected by said first prism, said oblique surfaces making an angle with the longer principal face of "a" degrees, the angular value "a" being less than 45° and more than approximately 20°, said angular value "a" being of a size such that a beam entering the first prism through the light entrance face and being normal to said light entrance face strikes a first of said oblique surfaces and is reflected to the longer principal face so as to make an angle of twice "a" degrees with the normal to said longer principal face which is greater than the critical angle for total reflection from said principal face, the longer principal face and the oblique surfaces all being perpendicular to a common plane, the second of said prisms being a cube corner prism having a transparent base and three mutually perpendicular reflecting surfaces which diverge from each other toward said transparent base, the base of said cube corner prism being placed substantially parallel to and adjacent the light entrance face of the longer principal face of the first prism, but leaving at least some space between the first and second prisms, so that a first of the oblique surfaces partially faces the cube corner prism, and leaving exposed the light exit face of the longer principal face of the first prism adjacent to the second of said oblique surfaces, an objective lens located in front of the shorter principal face of the first prism and opposite the base of the roof prism, and an eyepiece lens means located near the longer principal face of the first prism and alongside the cube corner prism and opposite the second oblique surface, whereby light rays from an object pass directly through the objective, the first prism and into the cube corner prism, undergo three reflections therein, are reflected back from the cube corner prism in a direction parallel and opposite to that in which they entered the cube corner prism, then reflected from the first oblique surface to the longer principal face, whence they are reflected to the second oblique surface and out through the eyepiece lens means.

6. A two prism optical system comprising a pair of solid prisms, a first of said prisms being an isosceles prism having a pair of oppositely disposed transparent parallel plane principal faces one of which is longer than the other, and a pair of converging reflecting oblique surfaces extending between said principal faces, the longer of said principal faces comprising both a light entrance face and a light exit face for light reflected by said first prism, said oblique surfaces making an angle with the longer principal face of "$a$" degrees, the angular value "$a$" being less than 45° and more than approximately 20°, said angular value "$a$" being of a size such that a beam entering the first prism through the light entrance face and being normal to said light entrance face strikes a first of said oblique surfaces and is reflected to the longer principal face so as to make an angle of twice "$a$" degrees with the normal to said longer principal face which is greater than the critical angle for total reflection from said principal face, the longer principal face and the oblique surfaces all being perpendicular to a common plane, the second of said prisms being a retrodirective reflecting prism having a transparent base and three mutually perpendicular reflecting surfaces which diverge from each other toward said transparent base, the transparent base of said retrodirective reflecting prism being placed parallel to and adjacent the light entrance face of the longer principal face of the first prism but leaving at least some space between the first and second prisms, so that a portion of said base is opposite a first of said oblique surfaces, and the remaining portion of said base extends beyond the edges of said first prism, a portion of the light exit face of the longer principal face of said first prism near the second oblique surface being left exposed, an objective lens in front of the protruding portions of said base, and an eyepiece lens means in back of the portion of said longer principal face and opposite the second oblique surface, whereby light from an object passes directly to the second prism, undergoes three reflections in said second prism, and is thereby reflected back out of the retrodirective reflecting prism in the direction parallel and opposite to that in which it entered the retrodirective reflecting prism and is reflected from the first oblique surface, then is reflected from the longer principal face and then is reflected from the second oblique surface and out through the light exit face to and through the eyepiece means.

7. An optical erecting prism system capable of reflecting a beam of light six times, and having displaced parallel entrance and exit axes, said system comprising two prisms each having three reflecting faces, and each prism deviating the beam normally 180° and each prism having a face which is common to the entrance and exit rays, the first of the prisms being an isosceles prism having oblique surfaces disposed at an angular value of "$a$" degrees of less than 45° and more than approximately 20° with respect to its entrance-exit face, the entrance-exit face and the oblique surfaces all being perpendicular to a common plane, said angular value "$a$" degrees being of a size such that a beam entering the isosceles prism substantially normally to the entrance-exit face strikes the entrance-exit face after reflection from a first of said oblique surfaces so as to make an angle of twice the angular value of "$a$" degrees with the normal to said entrance-exit face which is greater than the critical angle for total reflection from said entrance-exit face, so that the second reflection within it takes place at its entrance-exit face at an angle greater than the critical angle, thereby causing total reflection at the last-mentioned face, the second of the prisms having a constant deviation in all azimuths and being a retrodirective reflecting prism with a transparent base and three mutually perpendicular reflecting surfaces, which diverge from each other toward said transparent base, said first prism having a polished face parallel to its entrance-exit face, thereby constituting a window through which light may pass to or from said second prism, the transparent base of the second prism being spaced apart from, and substantially parallel to the entrance-exit face of the first prism, and leaving a portion of the entrance-exit face of the first prism exposed, three of said six reflections taking place at the mutually perpendicular surfaces of the retrodirective prism, and three within the isosceles prism.

8. An optical erecting prism system having parallel entrance and exit axes and capable of reflecting a beam of light six times, four of said reflections taking place at surfaces that are perpendicular to a single plane and two of which take place at roof surfaces, said system comprising two prisms each having three reflecting faces, and each prism deviating the beam normally 180° and each prism having common entrance and exit faces, the first of the prisms being an isosceles prism having oblique faces angularly disposed with respect to its entrance-exit face at an angle of "$a$" degrees thereto, the entrance-exit face and oblique surfaces all being perpendicular to a common plane, said angular value "$a$" being of a size such that a beam striking the entrance face after reflecting from a first of the oblique surfaces makes an angle of twice "$a$" degrees with the normal to said entrance-exit face which is greater than the critical angle for total reflection from said entrance-exit face, so that the second reflection within it takes place at its entrance-exit face at an angle greater than the critical angle, thereby causing total reflection at the last-mentioned face, the second of the prisms having a constant deviation in all azimuths being a retrodirective reflecting prism with a transparent base and three mutually perpendicular surfaces which diverge from each other toward said transparent base, three reflections taking place within said retrodirective reflecting prism, said first prism having a polished face parallel to its entrance-exit face, thereby constituting a window through which light may pass to or from said second prism, the two prisms being spaced apart from each other, the transparent base of the retrodirective reflecting prism being adjacent and substantially parallel to a face of the first prism, the second prism being disposed so as to leave a portion of the adjacent face of the first prism exposed, one of the mutually perpendicular surfaces of the retrodirective reflecting prism being perpendicular to said common plane of the isosceles prism.

9. A two prism optical system comprising a pair of solid prisms, a first of said prisms being an isosceles prism having a principal face and a pair of converging reflecting oblique surfaces extending from said principal face and on the same side thereof, said oblique surfaces and the principal face all being perpendicular to a common plane, the principal face comprising both a light entrance face and a light exit face for light reflected by said first prism, said oblique surfaces making an angle with the principal face of "$a$" degrees, the angular value "$a$" being less than 45° and more than approximately 20°, said angular value "$a$" being of a size such that a beam entering the first prism through the light entrance face and being normal to said light entrance face strikes a first of said oblique surfaces and is reflected to the principal face so as to make an angle of twice "$a$" degrees with the normal to said principal face which is greater than the critical angle for total reflection from said principal face, the second of said prisms being a retrodirective reflecting prism having a transparent base and three mutually perpendicular reflecting surfaces which diverge from each other toward the transparent base, the transparent base of said second prism being placed substantially parallel to and adjacent the light entrance portion of the principal face of the first prism and on the opposite side from the oblique surfaces, but leaving at least some space between the first and second prisms, so that a first of the oblique surfaces partially faces the retrodirective reflecting prism, and leaving exposed the light exit portion of the principal face of the first prism adjacent to the second of said oblique surfaces, whereby light rays from an object enter the prism retrodirective reflecting prism, undergo three reflections therein and are reflected out of the retrodirective reflecting prism in the direction parallel and opposite to that in which they entered the retrodirective reflecting prism through its light entrance face, are then reflected from a first of the oblique surfaces to said principal face, whence they are reflected to the second oblique surface and out through the light-exit portion of the principal face of the first prism.

References Cited in the file of this patent

UNITED STATES PATENTS

| | | |
|---|---|---|
| 230,320 | Molera et al. | July 20, 1880 |
| 2,364,811 | Perkins | Dec. 12, 1944 |
| 2,430,779 | Peck et al. | Nov. 11, 1947 |
| 2,456,521 | Maxwell | Dec. 14, 1948 |
| 2,472,600 | Luboshez | June 7, 1949 |

FOREIGN PATENTS

| | | |
|---|---|---|
| 16,223 | Great Britain | of 1891 |
| 1,965 | Great Britain | of 1909 |
| 603,839 | Germany | Oct. 9, 1934 |